US008537714B2

(12) United States Patent
Liu

(10) Patent No.: US 8,537,714 B2
(45) Date of Patent: *Sep. 17, 2013

(54) METHOD FOR DETERMINING A ROUTE IN A WIRELESS MESH NETWORK USING A METRIC BASED ON RADIO AND TRAFFIC LOAD

(71) Applicant: Thomson Licensing, Issy de Moulineaux (FR)

(72) Inventor: Hang Liu, Yardley, PA (US)

(73) Assignee: Thomson Licensing, Issy les Moulineau (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/645,721

(22) Filed: Oct. 5, 2012

(65) Prior Publication Data

US 2013/0070597 A1    Mar. 21, 2013

Related U.S. Application Data

(62) Division of application No. 12/084,271, filed on Apr. 29, 2008, now Pat. No. 8,335,164.

(51) Int. Cl.
*H04L 12/26* (2006.01)

(52) U.S. Cl.
USPC .......................................................... 370/252

(58) Field of Classification Search
USPC ................ 370/235, 236, 241, 252, 310, 351, 370/203, 229–232, 253, 912–913
See application file for complete search history.

(56) References Cited

U.S. PATENT DOCUMENTS 6,229,807 B1    5/2001  Bauchot et al.
6,684,247 B1    1/2004  Santos et al.

(Continued)

FOREIGN PATENT DOCUMENTS

WO    WO0040032      7/2000
WO    WO2005096566   10/2005

OTHER PUBLICATIONS

Zhao et al., "PARMA: A PHY/MAC Aware Routing Metric for Ad-Hoc Wireless Networks with Multi-Rate Radios", World of Wireless Mobile and Multimedia Networks, 2005, WOWMOM 2005, Sixth IEEE International Symposium on a Taormina-Giardini Naxos, Italy Jun. 13-16, 2005, p. 1-8.

(Continued)

*Primary Examiner* — Omar Ghowrwal
(74) *Attorney, Agent, or Firm* — Robert D. Shedd; Jeffrey M. Navon; Catherine A. Cooper

(57) ABSTRACT

A method and apparatus for calculating a routing metric for a wireless network including retrieving configured system parameters, selecting a form of a first weight factor based on channel load/utilization and parameters of the first weight factor, selecting a form of a second weight factor based on frame/packet error rate and parameters of the second weight factor, retrieving estimated link bit rate, measuring a channel/link busy time, estimating a channel/link load, estimating a packet/frame error rate of the link and calculating the metric are described. A method and system for determining a route/path between two nodes of a wireless network including calculating a weighted radio and load aware metric by each node in the wireless network, storing the metric and using the metric to select the route/path for communication between two nodes of the wireless network based on a sum of the metrics calculated by each node of the wireless network are also described.

10 Claims, 3 Drawing Sheets

(56) References Cited

U.S. PATENT DOCUMENTS

| | | |
|---|---|---|
| 6,873,600 B1 | 3/2005 | Duffield et al. |
| 2003/0202469 A1 | 10/2003 | Cain |
| 2003/0204616 A1* | 10/2003 | Billhartz et al. .............. 709/235 |
| 2004/0093426 A1 | 5/2004 | Sahasrabudhe et al. |
| 2005/0172024 A1* | 8/2005 | Cheifot et al. ................ 709/225 |
| 2005/0190771 A1* | 9/2005 | Tan et al. ................. 370/395.21 |
| 2006/0153081 A1 | 7/2006 | Simonsson et al. |
| 2006/0215683 A1* | 9/2006 | Sukkar et al. ................. 370/437 |
| 2007/0036096 A1 | 2/2007 | Sinivaara |
| 2011/0080853 A1 | 4/2011 | Thubert et al. |

OTHER PUBLICATIONS

Li et al., "Three Load Metrics for Routing In Ad Hoc Networks", Vehicular Technology Conference, 2005, VTC2004-Fall, 2004 IEEE 60th Los Angeles, CA, Sep. 26-29, 2004, pp. 2764-2768.

* cited by examiner

METHOD FOR DETERMINING A ROUTE IN A WIRELESS MESH NETWORK USING A METRIC BASED ON RADIO AND TRAFFIC LOAD

This application is a divisional of U.S. Pat. No. 8,335,164, filed Apr. 29, 2008, herein incorporated by reference.

FIELD OF THE INVENTION

The present invention relates to wireless networks and, in particular, to wireless mesh networks. Very specifically the present invention relates to a radio and traffic load aware routing metric for selecting a communications path in wireless mesh networks.

BACKGROUND OF THE INVENTION

In wireless mesh networks, a single-hop or multi-hop path needs to be selected to forward data frames/packets from a source node/mesh point to a destination node/mesh point. The path selection is based on a metric. Such a routing metric is important for optimizing the design of routing and forwarding mechanisms in mesh networks. Routing metrics for wired or optical networks do not account for the fact that nodes share the communications medium in wireless networks. Metrics that do exist for wireless mesh networks do not consider factors such as traffic load and error rate on the radio link.

Most of the current mesh routing protocols use the minimum hop count as the metric to make the path selection decision. With this approach, the quality of the radio link and the traffic load on the link is not considered. The path with the minimum number of hops is selected to forward the data frames. However, minimal hop count paths can have poor performance because they tend to include radio links between distant nodes and the quality of links along the path may not be good, let alone optimal. The radio links with a long physical span can be lossy, incurring a number of retransmissions and a low physical layer data rate. Many radio transmission systems, for example IEEE 802.11 radios, adapt the physical layer data rate depending on the link quality. This actually results in poor throughput and reduces the efficiency of network utilization compared to selecting a path with more hops but better link quality.

A prior art metric called "expected transmission count" (EXT) has been used as a routing metric. This metric estimates the number of retransmissions needed to successfully send a unicast packet by measuring the loss rate of broadcast packets between pairs of neighboring nodes. The routing protocol selects the path with the smallest total sum of the expected number of retransmissions. EXT takes the link loss rate, i.e. the number of needed retransmissions, into consideration but it does not take the link data rate and link load into account. Two links with different data rates may have the same loss rate. A heavily loaded link may incur a low loss rate and may be selected to include in the path so that this link becomes more loaded and congestion occurs.

Another known metric called "per-hop round trip time" (RTT) has been proposed as the routing metric. This metric estimates the round trip delay of unicast probing packets between neighboring nodes. The routing protocol selects the path with the lowest total sum of RTTs. The RTT metric implicitly accounts for the link quality and traffic load to avoid heavily loaded or lossy links. However, one problem with this metric is that it requires that every node in the mesh network to send probe packets to each of its neighbors, which introduces network overhead. Furthermore, this metric does not explicitly take the link data rate into account.

In radio/wireless networks, both the link/channel quality and load varies so the value of link metric changes frequently. This may cause the path to change frequently, leading to route instability. All the above measures do not consider how to maintain the route stability while achieving quick response to the link state and network topology changes. Clearly, a metric is needed for improved routing and forwarding mechanisms for wireless mesh networks that accounts for radio link quality and traffic load as well as route stability even in the face of rapidly changing link/channel quality and load variations.

SUMMARY OF THE INVENTION

The present invention is for a radio and traffic load aware metric that can be used by routing protocols/algorithms to select a communications path in a wireless mesh network. Furthermore, the present invention is a method to achieve quick responses to link state and network topology changes while maintaining the route stability by quantizing the routing metric.

A method and apparatus for calculating a routing metric for a wireless network including retrieving configured system parameters, selecting a form of a first weight factor based on channel load/utilization and parameters of the first weight factor, selecting a form of a second weight factor based on frame/packet error rate and parameters of the second weight factor, retrieving estimated link bit rate, measuring a channel/link busy time, estimating a channel/link load, estimating a packet/frame error rate of the link and calculating the metric are described. A method and system for determining a route/path between two nodes of a wireless network including calculating a weighted radio and load aware metric by each node in the wireless network, storing the metric and using the metric to select the route/path for communication between two nodes of the wireless network based on a sum of the metrics calculated by each node of the wireless network are also described.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
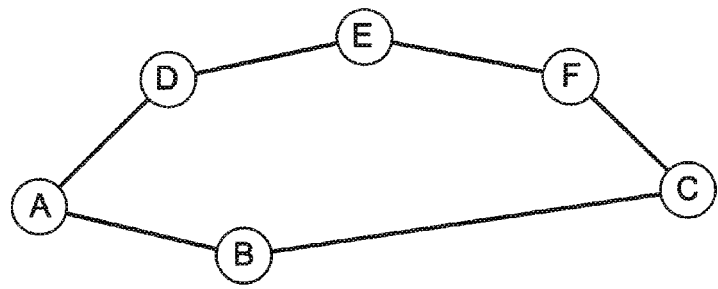
FIG. 1 is a schematic diagram of a wireless mesh network.

Let $T_{oh}$ denote the protocol overhead at the medium access control and physical layers, and L the test frame/packet size. Given a radio transmission system, $T_{oh}$ is a constant. For example, for IEEE 802.11a radio, $T_{oh}$ can be set to be 185 μs. The size of test frame/packet L can be a pre-configured constant, for example, 8224 bits. L can also be, for example, an average frame/packet size or a maximum frame/packet size. $T_{oh}$ and L are configured in advance by a designer/administrator and stored in a configuration file in a memory/storage device/unit. Alternatively L and $T_{oh}$ can be configured via a local configuration mechanism or through a network management system during system installation or initialization. Furthermore, let R denote the link bit rate at which the node transmits a frame/packet of the standard size L under current channel conditions. The link bit rate depends on the local implementation of the link rate adaptation. Let $E_r$ denote the frame/packet error rate if the node transmits frames/packets of the standard size L at the transmission bit rate R. $E_r$ can be measured and/or estimated by a node in the mesh network locally. Let $\rho$ denote the load/utilization of the channel/link. The routing metric of the present invention is a Weighted Radio and Load Aware (WRALA) link cost function. The WRALA cost function for each radio link can be calculated as $$WRALA = \left(T_{oh} + \frac{L}{R}\right) \times \frac{W_1(\rho)}{1-\rho} \times \frac{W_2(E_r)}{1-E_r}$$

where $W_1(\rho)$ and $W_2(E_r)$ are two weight functions/factors, depending on $\rho$ and $E_r$, respectively. Some possible forms of $W_1(\rho)$ are $$W_1(\rho) = 1 \quad (1)$$

In this case, all links are weighted equally.

$$W_1(\rho) = \begin{cases} 1 & \rho \leq \rho_0 \\ K_1 & \rho_0 < \rho \leq \rho_{max} \\ \infty & \rho > \rho_{max} \end{cases} \quad (2)$$

In this case, links with channel load/utilization less than $\rho_o$ are weighted equally. Links with channel load/utilization between $\rho_o$ and $\rho_{max}$ are weighted with an integer $K_1$. Links with channel load/utilization greater than $\rho_{max}$ are not considered in the path selection because their cost is infinite.

$$W_1(\rho) = \begin{cases} 1 & \rho \leq \rho_0 \\ A_1 e^{\alpha_1(\rho-\rho_0)} & \rho_0 < \rho \leq \rho_{max} \\ \infty & \rho > \rho_{max} \end{cases} \quad (3)$$

In this case, links with channel load/utilization less than $\rho_o$ are weighted equally. Links with channel load/utilization between $\rho_o$ and $\rho_{max}$ are given weights increasing with their channel load/utilization. Links with channel utilization greater than $\rho_{max}$ are not considered in the path selection because their cost is infinite. Note that form/equation (3) includes form/equation (2) implicitly as a special case, with $\alpha_1=0$ and $A_1=K_1$. Generally, the system designer/administrator can select suitable values of $\alpha_1, A_1, \rho_{max}$ and $\rho_o$ depending on targeted network revenue and application requirements. Similarly, some possible forms of $W_2(Er)$ are:

$$W_2(Er) = 1 \quad (1)$$

In this case, all links are weighted equally.

$$W_2(Er) = \begin{cases} 1 & Er \leq E_0 \\ K_2 & E_0 < Er \leq E_{max} \\ \infty & Er > E_{max} \end{cases} \quad (2)$$

In this case, links with packet/frame error rate less than $E_0$ are weighted equally. Links with packet/frame error rate between $E_0$ and $E_{max}$ are weighted with an integer $K_2$. Links with packet/frame error rate greater than $E_{max}$ are not considered in the path selection because their cost is infinite.

$$W_2(Er) = \begin{cases} 1 & Er \leq E_0 \\ A_2 e^{\alpha_2(Er-E_0)} & E_0 < Er \leq E_{max} \\ \infty & Er > E_{max} \end{cases} \quad (3)$$

In this case, links with packet/frame error rate less than $E_o$ are weighted equally. Links with packet/frame error rate between $E_o$ and $E_{max}$ are given weights increasing with their channel load/utilization. Links with packet/frame error rate greater than $E_{max}$ are not considered in the path selection because their cost is infinite. Note that once again form/equation (3) includes form/equation (2) implicitly as a special case, with $\alpha_2=0$ and $A_2=K_2$. Generally, the system designer/administrator can select suitable values of $\alpha_2, A_2, E_0$ and $E_{max}$ depending on targeted network revenue and application requirements.

Note that the weight functions $W_1(\rho)$ and $W_2(E_r)$ are not limited to the above forms. The weight functions may take other forms.

The WRALA link cost function of the present invention represents a composite routing metric, which takes the radio resources consumed by sending a packet/frame over a particular link and the load on the link into account.

Both the link/channel quality and load varies so the value of WRALA changes frequently. If WRALA is used directly as the routing metric, the path may change frequently, leading to route instability. Therefore, in cases where the link/channel quality varies frequently such that the path may also change frequently, the present invention includes a further metric to not only achieve quick response to the link state and network topology changes but also to maintain the route stability. A quantized version of WRALA is used as the link cost function. The quantized WRALA (QWRALA) can be in the form of $$QWRALA = \text{Ceiling}(M \times WRALA/Q)$$

or $$QWRALA = \begin{cases} \text{Ceiling}(M \times WRALA/Q) & \text{Ceiling}(M \times WRALA/Q) \leq M \\ \infty & \text{Ceiling}(M \times WRALA/Q) > M \end{cases}$$

or $$QWRALA = \begin{cases} \text{Ceiling}(M \times WRALA/Q) & \text{Ceiling}(M \times WRALA/Q) \leq M \\ M+1 & \text{Ceiling}(M \times WRALA/Q) > M \end{cases}$$

where M is the number of quantization levels and Q is the quantization factor. Generally, the system designer can choose a suitable Q depending on some targeted tradeoff of route stability and network response time to link state and topology changes. M and Q are configured in advance by a designer/administrator and stored in a configuration file in a memory/storage device/unit. Alternatively M and Q can be configured via a local configuration mechanism or through a network management system during system installation or initialization. In order to use a limited number of bits (a fixed size field) to represent the value of QWRALA, the value of QWRALA can be truncated to M+1 if it is larger than M+1.

A node can estimate the load/utilization of the channel/link to each of its neighbors. One possible method to estimate the channel load/utilization is to use the channel busy time. Due to the shared nature of wireless channels, the channel busy time is defined as any time when any node within the interference range performs transmission. When a node uses the channel to transmit a frame/packet, this channel is busy and other nodes within the interference range cannot simultaneously transmit using the same frequency. If another node attempts to transmit during this busy time, a collision occurs and the transmitted frames/packets of both nodes suffer errors. If the estimated channel busy time is $T_{busy}$ during a measurement period $T_p$, the channel load is $\rho=T_{busy}/T_p$ Channel busy time is the time during which either the physical carrier sense or network allocation vector (NAV) indicates channel busy.

The WRALA/QWRALA link cost metrics of the present invention can be applied to select the path in mesh networks. It can be incorporated into the design of routing protocols/algorithms, including on-demand, proactive, and hybrid routing protocols to select the path with the lowest total sum of the WRALAs/QWRALAs between nodes of potential paths.

For example, if the WRALA/QWRALA link metric is incorporated into a proactive link state routing protocol such as OLSR and OSPF, the WRALA/QWRALA link cost for each pair of links in the mesh network needs to be estimated. A node in the mesh network locally estimates the WRALA/QWRALA link costs to each of its neighbors and announces those link costs to other nodes of the network as part of the link state information in the routing control messages. Each node maintains a routing/forwarding table that allows it to forward data frames/packets destined for other nodes in the network. The routing/forwarding table is determined based on the cached link state information generated by each node. Using the WRALA/QWRALA link cost functions as the metric, a node determines the route to a destination with the lowest total sum of WRALA/QWRALA link costs. As an example as shown in FIG. 1, node A has two routes to destination C, A-B-C and A-D-E-F-C. The quality of link BC is very bad and/or the load of link BC is very high so the WRALA/QWRALA link cost is very large compared with the cost of the other links. The total sum of WRALA/QWRALA link costs for route A-B-C is larger than that for route A-D-E-F-C. Even if route A-B-C has fewer hops than route A-D-E-F-C, route A-D-E-F-C would be selected by node A to forward data packets/frames destined for node C. In the node A's routing table, the next hop will be node D, not node B, for destination C. It should be noted that if the link costs for two different paths are identical then secondarily, the hop count could be used to determine the route/path to select.

Another example is incorporating the WRALA/QWRALA metric into an on-demand routing protocol such as AODV that uses a Route Request (RREQ) and Route Reply (RREP) mechanism to establish routes between two nodes. The path with the lowest total sum of WRALA/QWRALA link costs is discovered, created and maintained when a source node wants to send data frames/packets to some destination node. It is assumed that each node has some mechanism to determine the WRALA/QWRALA link cost to each of its neighbors. In addition to other information, the destination address and the routing metric field are contained in the RREQ and RREP messages to propagate the metric information between nodes. When a source node wants to send data to some destination node and does not have a valid route to this destination, the source node initiates route discovery by flooding a Route Request (RREQ) message to all the nodes in the network, in which the destination address is specified and the metric field is initialized to zero. It should be noted that each intermediate or destination node may receive multiple copies of the same RREQ that originates at the source node. Each of these RREQs traverses a unique path from the source node to the processing node. A processing node is any node that processes RREQs including intermediate nodes and destination nodes. When a node receives a RREQ it updates the metric field by adding the link cost between the node from which it received RREQ message and itself (called updated metric). The node then establishes/creates a reverse route to the source node or updates its current reverse route if the RREQ passed through a route with a metric better than the current reverse route to the source. The intermediate node forwards (re-floods) the RREQ if a reverse route is established/modified or the RREQ is the first copy/instance of an RREQ. When a RREQ is forwarded, the metric field in the RREQ has the updated metric that reflects the cumulative metric of the route to the RREQ's source from the forwarding/intermediate node.

After creating or updating a reverse route to the source node, the destination node or the intermediate nodes with a valid route to the destination sends a unicast Route Reply (RREP) message back to the source node. In addition to other information, the RREP message contains a metric field to propagate the metric information. The RREP establishes a forward route to the destination in the intermediate nodes and eventually in the source node. When an intermediate node receives the RREP message, it updates the metric by adding the link cost between the node from which it received the RREP message and itself. It then establishes/creates a route to the destination node or updates its current route to the destination. The intermediate node forwards the RREP in unicast to the upstream node towards the source node based on the established reverse route. The metric field in the RREP is the updated metric, which reflects the cumulative metric of the route to the destination from the forwarding/intermediate node. When the source node receives the RREP, it creates/establishes a route to the destination. After a RREP has been sent, if the destination node receives further RREQs with better metrics, the destination node updates its route to the source node and also sends a fresh RREP to the source node along the updated route. Thus, a bidirectional, optimal end-to-end metric with the lowest cumulative value of WRALA/QWRALA link costs is established between the source node and the destination node.

Figure 2:
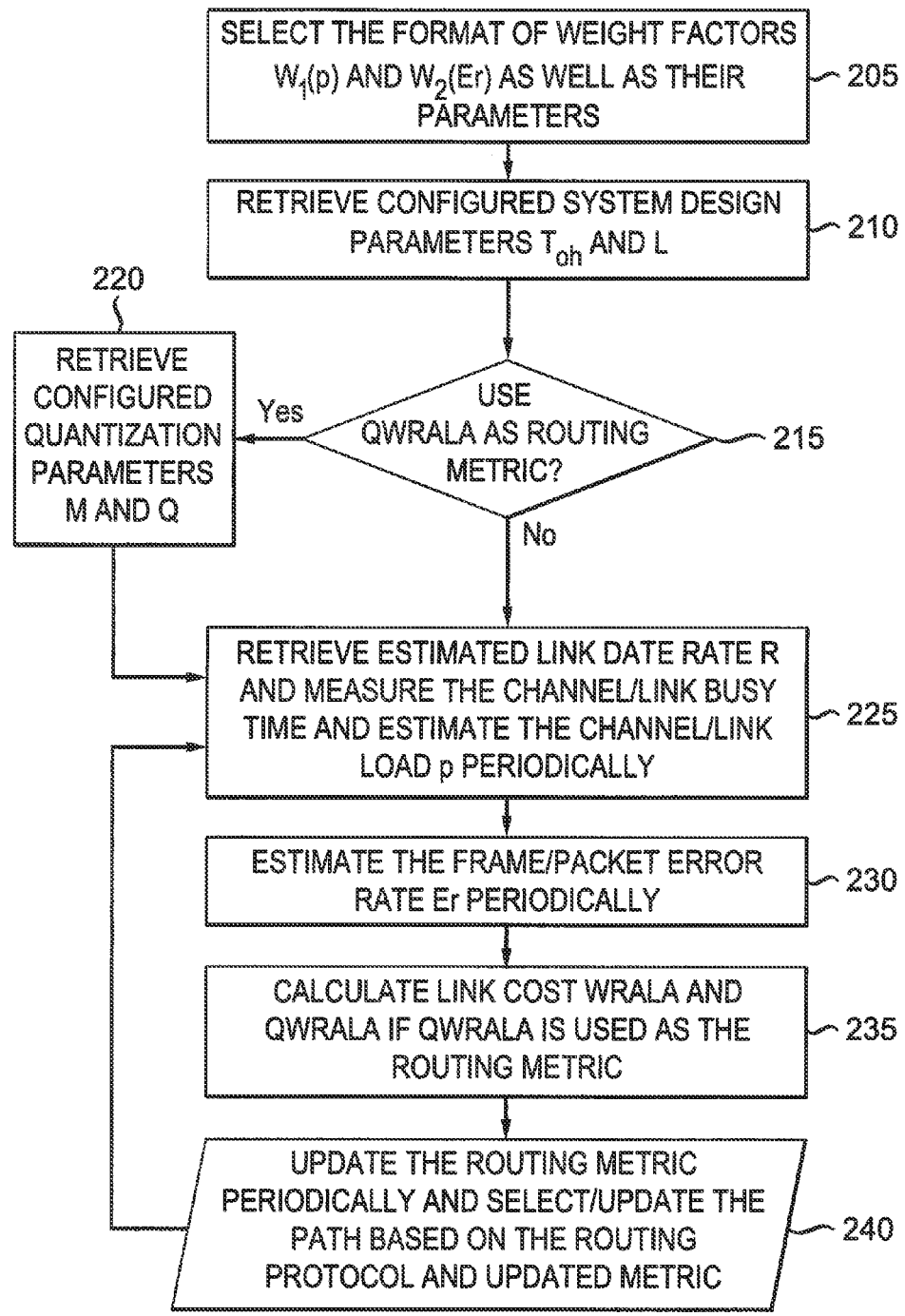
FIG. 2 is a flowchart of the method computing/calculating a radio and traffic load aware metric in accordance with the present invention.

Referring now to FIG. 2, the radio and traffic aware routing metrics (WRALA and QWRALA) of the present invention are calculated as described below. At 205 the form of the weight functions/factors $W_1(r)$ and $W_2(E_r)$ is selected as well as their parameters. The system design parameters are retrieved from storage/memory at 210. The design parameters were configured by a designer or administrator and stored in a memory/storage unit, including the protocol overhead $T_{oh}$ depending on the radio system/network used and the test packet/frame size L according to the application and network requirements. A determination is made at 215 if the QWRALA is to be used as the routing metric. If so, then the configured quantization parameters M and Q are retrieved from memory/storage at 220. M and Q are configured according to the targeted tradeoffs of route stability and network response time to the link state and topology changes. The link bit rate, which is estimated by the radio, is retrieved, the channel/link busy time is measured and the channel/link load $\rho$ is estimated at 225 by the node. The measurement of the channel/link busy time and the estimation of the channel/link load is performed periodically. At 230 the frame/packet error rate $E_r$ is measured and/or estimated periodically. The link cost (WRALA or QWRALA) is calculated at 235. QWRALA is calculated only if it was determined earlier that route stability or other issues required its use. The routing metric is updated periodically and paths are selected/updated based on the routing protocol and updated metric at 240. In actuality, metric updates can be scheduled or performed based on expiration of a timer or any other means that has the effect of periodically updating the metric. Based on metric updates, routes/paths may be updated as well. The metric updates are communicated via the communications module and an appropriate protocol (e.g., on-demand or proactive protocols) to other nodes in the network.

Figure 3:
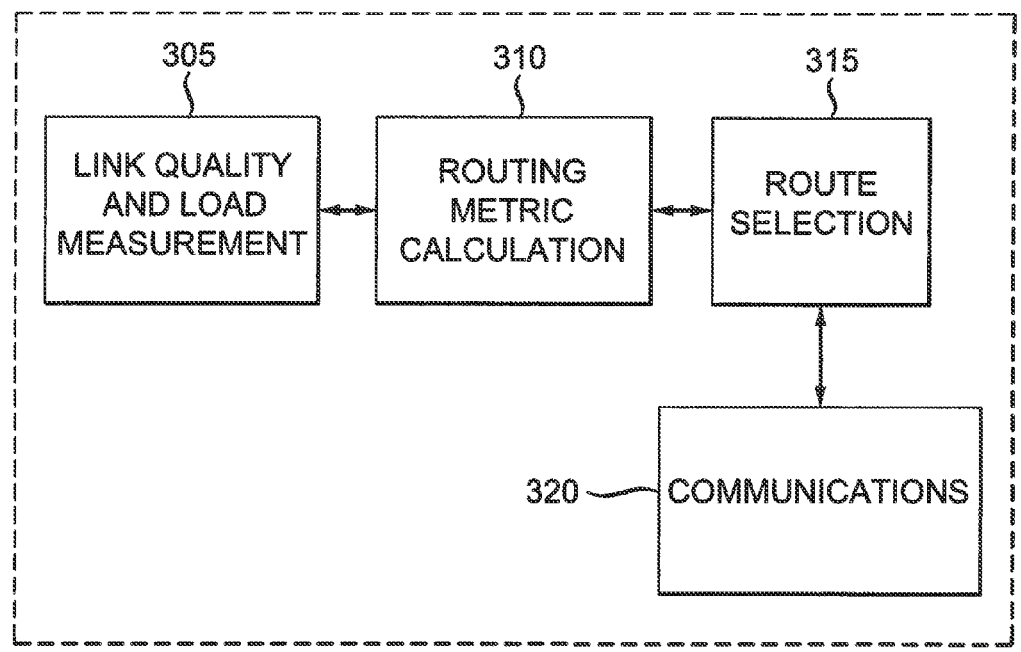
FIG. 3 is a block diagram of an apparatus in which the radio and traffc load aware metric of the present invention is practiced.

FIG. 3 is a block diagram illustrating the details of a node 300 using the radio and traffic aware routing metrics (WRALA/QWRALA) of the present invention. The node includes a link quality and load measurement module 305, a routing metric calculation module 310, a route selection module 315 and a communication module 320. The link quality and load measurement module 305 measures the quality and the load of the link/channel to each of its neighbors. The link quality and load measurement module 305 measures the channel link busy time and the frame/packet error rate periodically. It provides the measurement results to the routing metric calculation module 310 so that the routing metric calculation module 310 can determine the link cost to each of its neighbors. Note that a node may have multiple neighbors, multiple radio interfaces, and multiple physical/logical channels/links. All of them need to be measured. The routing metric calculation module 310 of each node uses the measurements made by the link quality and load measurement module along with other information to calculate the radio and traffic load aware metric for each node with which it communicates. Such information includes the weight factors/functions and their parameters, configured design parameters such as protocol overhead of the radio network and test frame/packet size and the quantization parameters. The routing metric is updated periodically. The route selection module 315 determines/selects a route/path to forward/communicate data to a destination node based on the calculated radio and traffic aware metrics. Route selection module 315 communicates information to other nodes in the network either via the RREQ/RREP scheme if an on-demand routing protocol is being used or as part of the link state information if a link state protocol is being used. It also exchanges the routing control messages and data with other nodes in the network via the communication module 315. It should be noted that a node may have one or more radio communication interfaces and other communication interfaces.

Figure 4:
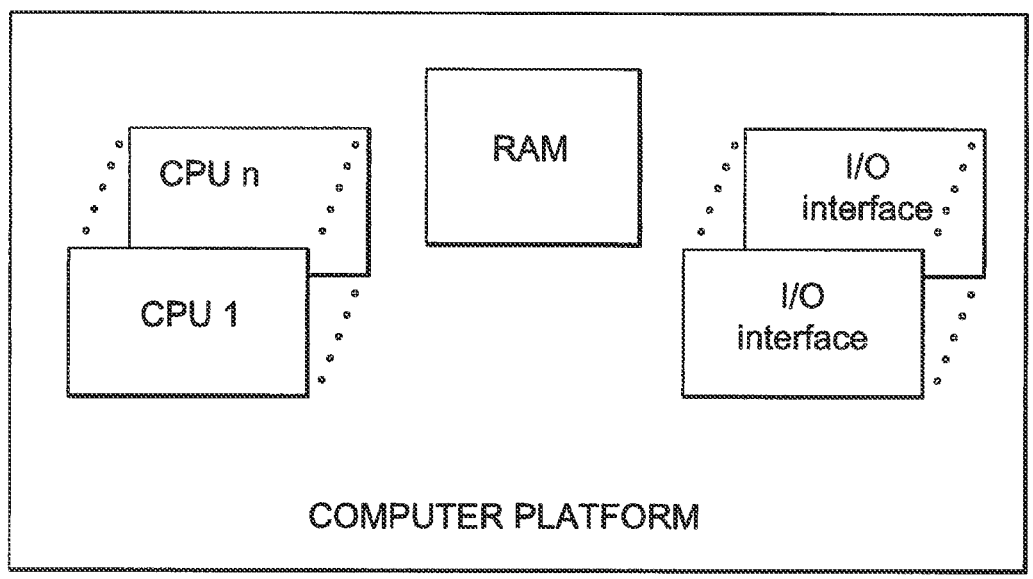
FIG. 4 is a block diagram of an apparatus in which the radio load aware metric of the present invention is practiced.

In proactive routing protocols, to maintain the route stability while achieving a reasonably quick response to the link state and topology changes, a node immediately announces the state change for one of its links to the other nodes in the network by flooding the routing control messages if and only if the changes in the WRALA/QWRALA metric for this link are greater than a threshold, compared with the value in its last announcement. The node immediately floods routing messages to announce the change in the link state if (and only if) (WRALA(current)−WRALA(last))/WRALA(last)× 100%>X %, It is to be understood that the present invention may be implemented in various forms of hardware, software, firmware, special purpose processors, or a combination thereof, for example, within a mobile terminal, access point, or a cellular network. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform as shown in FIG. 4 having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for determining a route between two nodes of a wireless network comprising a plurality of nodes, said method comprising:

calculating a weighted radio and load aware routing metric by a node in said wireless network;

storing, by said node, said weighted radio and load aware routing metric; and using, by said node, said weighted radio and load aware routing metric to select said route for communication between said two nodes of said wireless network based on a sum of weighted radio and load aware routing metrics calculated by each node of said plurality of nodes of said wireless network, wherein said calculating further comprises:

retrieving parameters of said wireless network, wherein said parameters include protocol overhead and a test packet size;

selecting a form of a first weight factor based on channel load and selecting a parameter of said first weight factor;

selecting a form of a second weight factor based on packet error rate and selecting a parameter of said second weight factor;

retrieving an estimated channel bit rate;

measuring a channel busy time, wherein said channel busy time is any time when any other node within an interference range performs transmission, said transmission being detected by physical carrier sensing or virtual carrier sensing;

estimating said channel load, wherein said estimated channel load is said channel busy time divided by a measurement period;

estimating said packet error rate of the channel; and calculating said weighted radio and load aware routing metric based on said wireless network parameters, said first weight factor, said second weight factor, said estimated channel bit rate, said estimated channel load and said estimated packet error rate.

2. The method according to claim 1, further comprising communicating said calculated weighted radio and load aware routing metric to other nodes in said wireless network.

3. The method according to claim 1, further comprising announcing said calculated weighted radio and load aware routing metric to other nodes in said wireless network only when said weighted radio and load aware routing metric is greater than a pre-determined threshold.

4. The method according to claim 1, wherein said weighted radio and load aware metric is a quantized weighted radio and load aware metric.

5. The method according to claim 1, wherein said wireless network is a wireless mesh routing network.

6. A node for determining a route between two nodes of a wireless network comprising a plurality of nodes, said node comprising:
at least one central processing unit;
random access memory;
one or more input/output interfaces; and further comprising:
means for calculating a weighted radio and load aware routing metric;
means for storing said weighted radio and load aware routing metric; and
means for using said weighted radio and load aware routing metric to select said route for communication between said two nodes of said wireless network based on a sum of weighted radio and load aware routing metrics calculated by each node of said plurality of nodes of said wireless network, wherein said means for calculating further comprises:
retrieving parameters of said wireless network, wherein said parameters include protocol overhead and a test packet size;
means for selecting a form of a first weight factor based on channel load and selecting a parameter of said first weight factor;
means for selectin a form of a second weight factor based on packet error rate and selecting a parameter of said second weight factor;
means for retrieving an estimated channel bit rate;
means for measuring a channel busy time, wherein said channel busy time is any time when any other node within an interference range performs transmission, said transmission being detected by physical carrier sensing or virtual carrier sensing;
means for estimating said channel load, wherein said estimated channel load is said channel busy time divided by a measurement period;
means for estimating said packet error rate of the channel; and
means for calculating said weighted radio and load aware routing metric based on said wireless network parameters, said first weight factor, said second weight factor, said estimated channel bit rate, said estimated channel load and said estimated packet error rate.

7. The node according to claim 6, further comprising means for communicating said calculated weighted radio and load aware routing metric to other nodes in said wireless network.

8. The node according to claim 6, further comprising means for announcing said calculated weighted radio and load aware routing metric to other nodes in said wireless network only when said weighted radio and load aware routing metric is greater than a pre-determined threshold.

9. The node according to claim 6, wherein said weighted radio and load aware metric is a quantized weighted radio and load aware metric.

10. The node according to claim 6, wherein said wireless network is a wireless mesh routing network.

\* \* \* \* \*